United States Patent [19]
Stumpf et al.

[11] Patent Number: 5,824,237
[45] Date of Patent: Oct. 20, 1998

[54] APPARATUS FOR MANUFACTURING PLASTIC ARTICLES

[75] Inventors: Hauke Stumpf, Alsfeld; Karl Schulte, Buchholz, both of Germany

[73] Assignee: TUHH Technologie GmbH, Hamburg, Germany

[21] Appl. No.: 562,147

[22] Filed: Nov. 22, 1995

[30] Foreign Application Priority Data

Nov. 24, 1994 [DE] Germany .......................... 44 41 815.9

[51] Int. Cl.$^6$ .......................... B29C 33/02; B29C 45/73
[52] U.S. Cl. .......................... 249/80; 425/526; 425/548; 425/552
[58] Field of Search ................... 249/80, 79, 78; 425/526, 548, 552

[56] References Cited

U.S. PATENT DOCUMENTS

| | | | |
|---|---|---|---|
| 4,338,068 | 7/1982 | Suh et al. .................................. | 249/80 |
| 5,041,247 | 8/1991 | Kim ......................................... | 425/526 |
| 5,190,715 | 3/1993 | Yamada et al. ........................... | 425/526 |
| 5,234,637 | 8/1993 | Reymann et al. ........................ | 425/526 |
| 5,376,317 | 12/1994 | Maus et al. .............................. | 425/548 |

FOREIGN PATENT DOCUMENTS 57-20328  2/1982  Japan ..................................... 425/526

*Primary Examiner*—Robert Davis
*Attorney, Agent, or Firm*—Robert W. Becker & Associates

[57] ABSTRACT

A method and apparatus for producing a plastic article. The plastic is introduced into a mold that can be tempered and that has at least one hollow chamber, the contour of which corresponds to the outer contour of the article. During manufacture, the mold is heated up and removal of the article is effected with a cooled mold. To shorten the cycling time, the inner region of the mold that adjoins the hollow chamber is cooled and heated at least partially independently of the outer region that is remote from the hollow chamber, while the outer region is held at a temperature that is higher than the temperature during removal.

15 Claims, 2 Drawing Sheets

APPARATUS FOR MANUFACTURING PLASTIC ARTICLES

BACKGROUND OF THE INVENTION

The present invention relates to a method for manufacturing a plastic member or article, for example from a thermoplastic material, a compounded thermoplastic, or composite materials. With this method, the plastic is introduced into a mold that can be tempered and that defines at least one hollow chamber, the contour of which corresponds to the outer contour of the article. During the manufacture, the mold is heated and at least the removal of the article is effected with the mold cooled. The present invention also relates to an apparatus for manufacturing a plastic member or article, especially for carrying out the inventive method.

The manufacture of plastic articles, for example by injection molding or by extrusion blow molding, involves mass production, so that it is also important for economical reasons to keep the cycle times during the manufacture of such plastic articles or members as short as possible. However, it is frequently necessary that the molds used to manufacture the plastic articles be heated up during a cycle and subsequently be cooled back down. This process is frequently carried out in that the hot plasticized material is first introduced into a hot mold that is subsequently cooled until the plastic article achieves an adequate rigidity of shape so that it can be removed from the mold. It is of course also possible to first introduce the plastic into a cold mold and to heat it together with the mold. The cycling time for the manufacture of plastic articles is therefore affected among other things essentially by the time necessary for heating the mold up on the one hand and for cooling the mold down on the other hand. However, the speed of temperature change not only of the plastic material but also of the mold is a physical characteristic that cannot be arbitrarily varied. Especially with the processing of thermoplastic composite materials, the physical limitation of the speed of temperature change comes into operation, since in this case relatively high process temperatures, for example up to 400° C., are required during the processing of polyether ketones. The times for heating up and cooling off the mold take correspondingly long, so that the overall cycle period is increased. This has the drawback that the manufacture of articles of such materials is uneconomical for large quantities. The process temperature here means the processing temperature that exists in the hollow chamber of the mold or the processing temperature that occurs at the inner surfaces of the mold that adjoin the hollow chamber when the plastic is in the mold.

A mold that is used, for example, during injection molding or extrusion blow molding frequently, especially due to the mold rigidity that is required, comprises molds made of metallic materials, such as steel, that therefore generally have a large mass. The result of this is that for molds having a high thermal capacity and a relatively low thermal conductivity, with high temperature differences correspondingly longer times for heating up and cooling down are required. Although in principle it is possible that a considerable increase of the speed of temperature change, for example during heating up, can be effected by a correspondingly high heating power, such heat-flux densities can at the present time not be economically realized, especially for large pieces having correspondingly large molds. Furthermore, providing such a large heating power can also represent a great environmental pollution since the thermal energy that is introduced must subsequently again be withdrawn directly from the mold.

To reduce energy losses, DE-OS 38 32 284 discloses a method and apparatus for the thermal change over of a member between a heating and a cooling phase for the treatment of plastic. With this method, in the heating phase the temperature is determined by a layer that can be heated electrically and that adjoins the hollow mold chamber. The cooling phase is essentially determined by the temperature of the remaining body of the mold, which is held at a low temperature. No direct cooling of the inner layer is provided. Especially when processing large plastic articles or articles of composite materials that on the one hand can have a large volume of material and on the other hand require an increased operating temperature, this known method and apparatus unfortunately have the draw-back that the thermal energy that is introduced may not be sufficient to melt the material. Furthermore, with such an apparatus it is possible to only accelerate the cooling process.

However, it has been established that the heating period is to a large extent affected by the aforementioned limitations. In particular in the case of an electrical heating, the heating is effected linearly with time and therefore has a corresponding longer duration as a function of the magnitude of the plastic portion on the one hand and the magnitude of the temperature difference that is to be overcome on the other hand. However, also in the case of convective heating with hot fluids, greater problems exist during the heating process than exist, for example, with convective cooling. In particular, the use of water at high temperatures is no longer readily possible due to the relatively low vaporization temperature at the generally customary pressures. However, the thermal oils that are frequently used have a poor thermal conductivity, so that here also the heating periods are problematic at higher operating temperatures.

It is therefore an object of the present invention to provide a method whereby in particular the heating time of a cycle can be shortened. It is a further object of the present invention to provide an apparatus that makes it possible to have a correspondingly shorter heating period.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
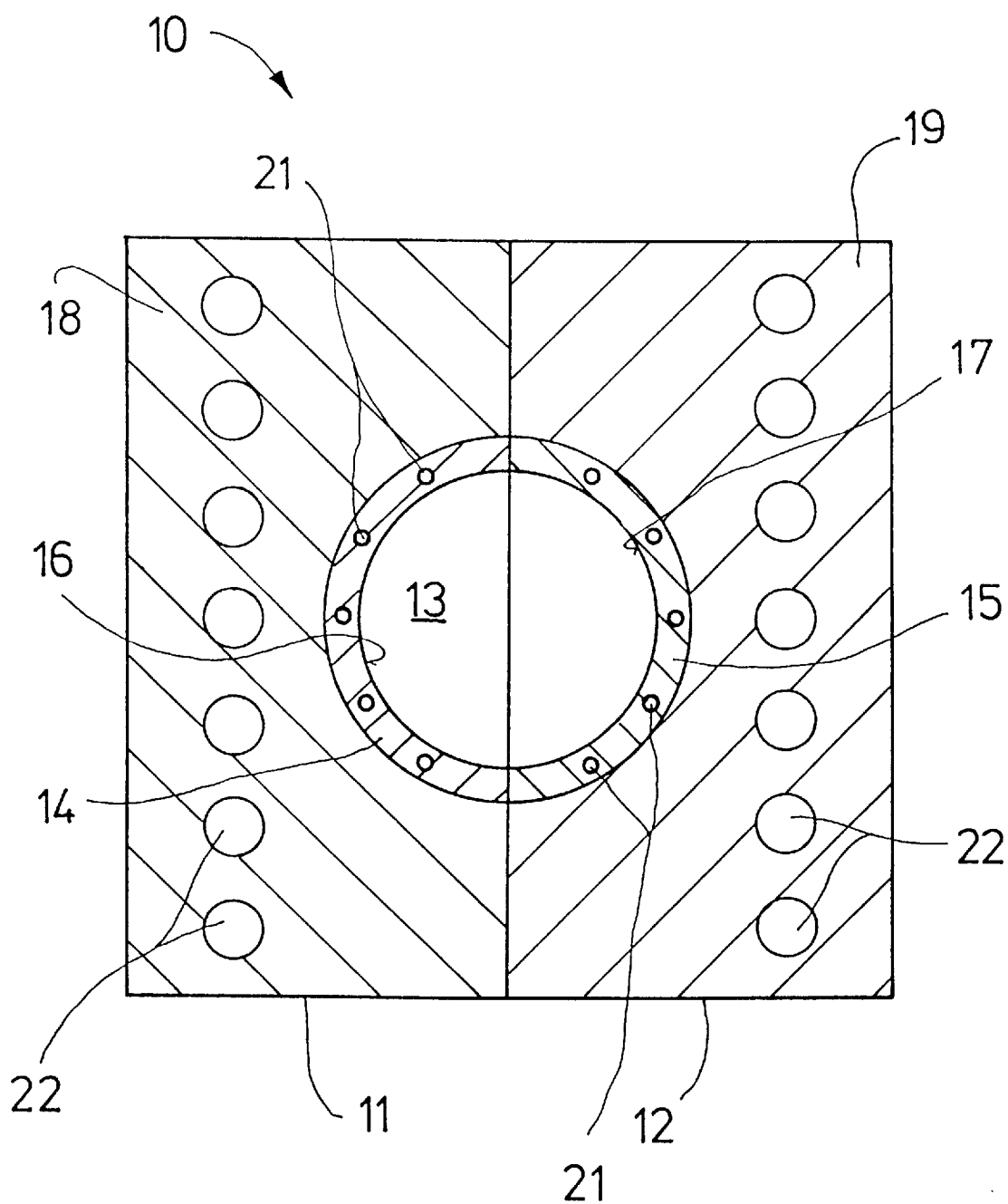
FIG. 1 is a cross-sectional view through a first exemplary embodiment of the inventive mold.

The method of the present invention is characterized primarily in that the inner region of the mold that adjoins the hollow chamber is cooled and heated up at least partially independently from the outer region of the mold that is remote from the hollow chamber, while the outer region is held at a temperature that is greater than the temperature upon removal of the plastic article. This procedure has the advantage that the temperature changes that are required for manufacturing a plastic article are limited to the inner region of the mold, in other words that region that is in direct contact with the plastic article. At the same time, the outer region of the mold is held at an at least approximately constant temperature that is higher than the temperature required for the removal of the plastic article from the mold. Thus, the outer region of the mold, which is expediently considerably larger than the inner region of the mold, serves as a heat supplier or heat reservoir, thus accelerating heating up of the inner region.

Pursuant to one advantageous specific embodiment of the present invention, the outer region is held at an essentially constant temperature that corresponds approximately to the temperature of the hot mold, in other words, the process temperature. This has the advantage that after termination of the cooling process, the inner region of the mold can heat up to the required process temperature solely due to the temperature difference. Depending upon the embodiment, in so doing it is no longer necessary to additionally heat the inner region.

It would be possible, for example, during the heating period to heat up not only the outer region but also the inner region by convective or electrical heating. However, it is expedient that the inner and outer regions of the mold be able to be tempered independently of one another. This has the advantage that the outer region can always be kept at a constant temperature while the inner region can be appropriately cooled during the cooling phase and can be heated up particularly rapidly during the heating phase by means of an additional heating aided by the thermal energy that is delivered from the outer region.

In this connection, at least one region can be convectively heated. However, it can also be expedient to electrically heat at least one region. It is furthermore advantageous to convectively cool the inner region. The convective cooling can be effected, for example, with water, as a result of which a particularly good thermal transfer between the cooling medium and the mold can be achieved.

It is apparent that the heating phase of a cycle can be considerably shortened with the inventive method. The reason for this is that on the one hand merely a small inner region must be heated up from the low removal temperature to the hot process temperature. On the other hand, due to the preferably large outer region, a quantity of heat is available during the heating process that further accelerates this heating process. In this connection, the temperature of the outer region can be essentially maintained by generally known means. The outer region therefore does not have to be alternately cooled and subsequently reheated; rather, it is merely necessary to compensate for the thermal difference that occurs due to the withdrawal of thermal energy by the inner region during the cooling and heating process. By these measures, it is furthermore possible for the manufacturing process to run energetically economically. It can even be expedient for the temperature of the outer region to be greater than the process temperature. This can effect a further acceleration of the heating phase. In so doing, the temperature of the outer region must be selected such that a cooling of the inner region can still be effected with technically expedient and economical measures.

The inventive apparatus for manufacturing a member or article of thermoplastic material is characterized primarily by a mold that defines at least one hollow chamber, the inner contour of which corresponds to the outer contour of the article. Especially for carrying out the aforementioned inventive method, it is proposed that the inner region of the mold that adjoins the hollow chamber be made at least partially of a material that has a different heat conductivity than does the material of the outer region that is remote from the hollow chamber. In this connection, it is expedient for the inner region to have a higher heat conductivity or thermal diffusivity than does the outer region. This embodiment has the advantage that the temperature of the inner region can be altered considerably more rapidly.

Pursuant to one advantageous specific embodiment of the inventive apparatus, the inner region of the mold can be tempered independently of the outer region of the mold. This has the advantage that it is merely necessary to cool the inner region during the cooling process of the mold for the removal of the plastic article, while the outer region can, for example, be held at a higher temperature. Thus, during the heating phase the outer region aids in the heating of the inner region since the quantity of heat in the outer region is transferred to the inner region.

Pursuant to another advantageous specific embodiment of the inventive apparatus, the volume of the inner region is considerably smaller than the volume of the outer region. This has the advantage that the energy needed to heat the mold, i.e. the walls that define the hollow chamber of the mold, can be reduced. A similar situation applies during cooling of these walls since only a small quantity of heat has to be withdrawn. The main point is that the absolute heat capacity of the outer region is greater than that of the inner region.

It can be expedient for at least one of the regions to be able to heated convectively. However, it is also possible for at least one region to be heated electrically. Pursuant to another specific embodiment of the present invention, it is also possible for at least the inner region to be convectively cooled. In this connection, due to the great amount of heat that can be withdrawn, it is expedient for the inner region to be provided with water cooling.

Pursuant to yet another specific embodiment of the present invention, the inner region can be detachably connected to the outer region. This has the advantage that the outer region, which serves as a heat reservoir, can be universally utilized for a plurality of molds. In this connection, the specific arrangement can be such that the outer contour of the respectively used components that form the inner region corresponds to the inner contour of the parts that form the outer region of the mold.

It is furthermore advantageous for the inner region to comprise an aluminum alloy or brass. However, it can also be expedient for the inner region to be made of a copper alloy. These materials have a high heat conductivity or thermal diffusivity so that a heating or cooling process can be carried out in an appropriately short amount of time.

In one specific embodiment of the present invention the outer region is made of steel. This has the advantage that on the one hand the inner region, which preferably has a thin wall, receives mechanical support from the outer region. Furthermore, steel has a low temperature conductivity or thermal diffusivity and a high heat storage capacity, so that the desired heat transfer characteristics from the outer region to the inner region can be effected.

In another specific embodiment of the present invention, at least one insulating layer is disposed between the inner region and the outer region. The provision of an insulating layer has the advantage that too great of a heat transfer from the outer region can be avoided, for example during the cooling phase. It can be expedient for the insulating layer to have a temperature-dependent heat transfer coefficient. It can also be expedient for the heat transfer coefficient of the insulating layer to be adjustable.

Pursuant to another specific embodiment of the present invention, at least one resilient layer is furthermore disposed between the inner region and the outer region. This arrangement has the advantage that different heat expansion properties of one or the other layer that might possibly occur due to the temperature changes and the possibly existing different heat expansion coefficients can be compensated for. In this connection, the resilient layer can at the same time be embodied as an insulating layer. Furthermore, it is also possible for not only the inner layer but also the outer layer to respectively have essentially the same heat expansion coefficients and hence a similar heat expansion property. This has the advantage that stresses that might occur due to the different temperatures, especially during the cooling phase, can be avoided.

Further specific features of the present invention will be described in detail subsequently.

DESCRIPTION OF PREFERRED EMBODIMENTS

Referring now to the drawings in detail, the illustrated form or mold 10 comprises two mold halves 11, 12 that in the closed position illustrated in the drawings define a hollow mold chamber 13. Via means that are not illustrated and are known per se, the mold halves 11, 12 can be moved back in forth so that the plastic member or article that is formed in the hollow chamber 13 can be removed when the mold is in an open position (not illustrated). Via means that are again not illustrated and are known per se, the synthetic material is introduced into the hollow mold chamber, for example by being injected or extruded. It is of course also possible for the mold halves 11, 12 to define a plurality of mold chambers that are interconnected, for example via channels. It is furthermore possible to also produce hollow plastic articles, for example by extrusion blow molding or by the presence of cores. There are a great variety of mold types so that no further explanation thereof is required for an understanding of the present invention.

Each of the mold halves 11, 12 is provided with an inner region 14, 15, the inner walls or surfaces 16, 17 of which are directly adjacent to the hollow chamber 13. The inner regions 14, 15 are surrounded by outer regions 18, 19 of the mold halves 11, 12. As schematically illustrated in the drawings, the dimensions of the outer regions 18, 19 are greater than those of the inner regions 14, 15.

Figure 2:
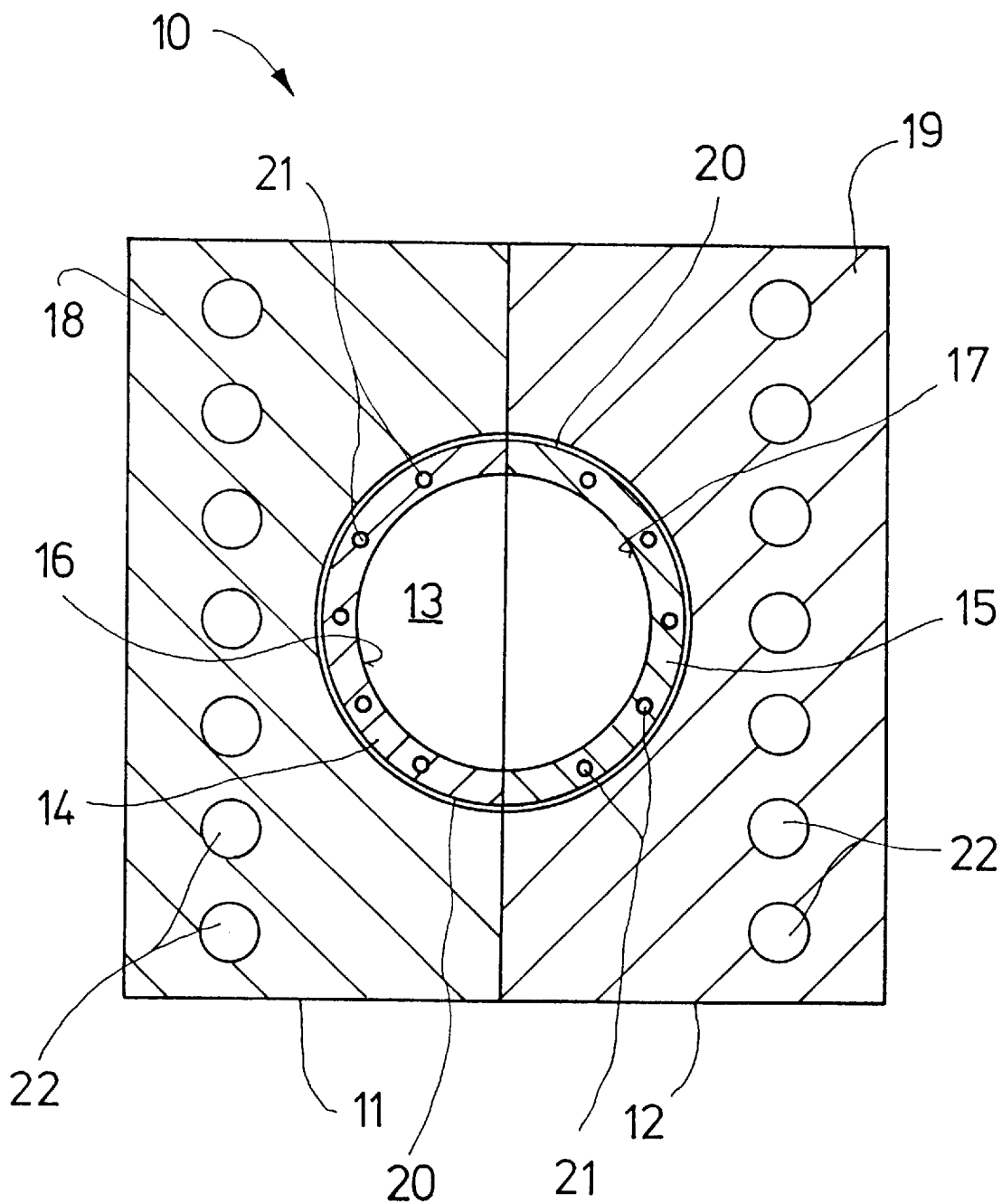
FIG. 2 is a cross-sectional view of a second exemplary embodiment of the inventive mold.

In the embodiment illustrated in FIG. 1, the outer wall of the inner regions 14, 15 rests directly against the outer regions 18, 19. In contrast, in the embodiment illustrated in FIG. 2, a respective insulating layer 20 is provided between the inner regions 14, 15 and the outer regions 18, 19. The insulating layer 20 can, for example, be made of a conventional insulating material. In other respects, the embodiments of FIGS. 1 and 2 correspond with one another, so that like components are indicated by the same reference numerals.

Each inner region 14, 15 of a mold half 11, 12 is provided with channels 21 that serve for cooling of the inner region by convective cooling. Cooling medium such as water is conveyed through these channels 21 in order during the cooling phase to cool the inner region 14, 15, and hence the inner walls 16, 17 of the inner regions, to a temperature that allows the plastic article to be removed. By means of appropriate, non-illustrated valve means, it is also possible to convey an appropriate heating medium, such as a thermal oil, through these channels 21 during the heating process. It is of course also possible to provide other additional channels in the inner regions.

It is to be understood that it would also be possible to electrically heat the inner region. The electrical connections and the required power supply lines are not shown in the drawing.

The outer regions 18, 19 of the mold halves 11, 12 are similarly provided with channels 22 through which is conveyed, for example, a heating medium for maintaining the temperature. However, here also it is possible for the outer regions 18, 19 to be electrically heated.

In the embodiments illustrated in the drawings, cooling of the inner regions 14, 15 is effected by convective cooling. It is, of course, also possible for a different cooling means to be provided, for example by utilizing the reverse of the thermo electric effect. It is furthermore also possible to provide a resilient layer between the outer wall of the inner region 14, 15 and the inner wall of the outer region 18, 19 in order to be able to compensate for thermal stresses. It is of course also possible for the inner region 14, 15 and the outer region 18, 19 not to be in direct physical contact with one another, but rather for a narrow gap to exist between them, so that in this way thermal stresses can also be avoided. Such a gap can, for example, be filled with a grease, lubricant or other material that on the one hand permits differing expansions of the inner and outer regions and also has an adequate heat conductivity.

The present invention is, of course, in no way restricted to the specific disclosure of the specification and drawings, but also encompasses any modifications within the scope of the appended claims.

What we claim is:

1. An apparatus for manufacturing a plastic article, comprising:
    a mold having at least one hollow chamber, which has an inner contour that corresponds to the outer contour of said article, said mold also having an inner region adjoining said at least one hollow chamber and an outer region remote from said at least one hollow chamber, said inner region being made at least in part of a material that has a different thermal diffusivity than does the material of said outer region;
    at least one insulating layer, which is disposed between said inner region and said outer region and has a temperature-dependent heat transfer coefficient; and
    means for adjusting said heat transfer coefficient of said insulating layer.

2. An apparatus according to claim 1, wherein said inner region has a higher thermal diffusivity than does said outer region.

3. An apparatus according to claim 1, wherein said inner region of said mold can be tempered independently of said outer region.

4. An apparatus according to claim 1, wherein said inner region has a volume that is less than the volume of said outer region.

5. An apparatus according to claim 1, wherein at least said inner region is adapted to be heated convectively.

6. An apparatus according to claim 1, wherein at least said inner region is adapted to be heated electrically.

7. An apparatus according to claim 1, wherein at least said inner region is adapted to be cooled convectively.

8. An apparatus according to claim 1, wherein at least said inner region is provided with water cooling means.

9. An apparatus according to claim 1, wherein said inner region is detachably connected to said outer region.

10. An apparatus according to claim 1, wherein said inner region is made of a material selected from the group consisting of aluminum alloy and copper alloy.

11. An apparatus according to claim 1, wherein said outer region is made of steel.

12. An apparatus according to claim 1, wherein at least one resilient layer is disposed between said inner region and said outer region.

13. An apparatus according to claim 1, wherein at least one gap is provided between said inner region and said outer region.

14. An apparatus according to claim 1, wherein said outer region has a high heat storage capacity.

15. An apparatus according to claim 1, which includes means for maintaining said outer region at an essentially constant temperature that corresponds approximately to at least a process temperature.

* * * * *